Figure 1:
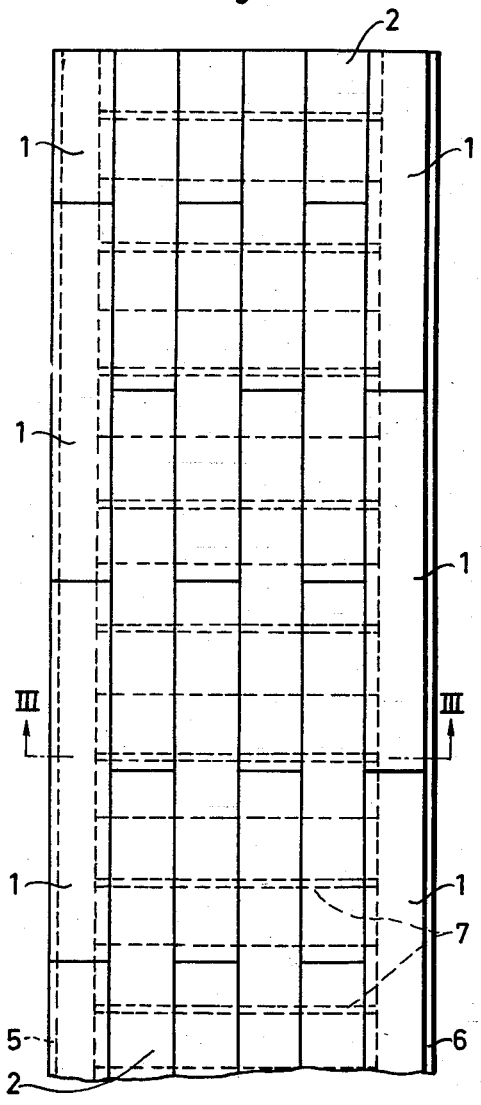

Aug. 25, 1959 — G. KÄHR — 2,900,676
LAMINATED PARQUET BOARDS
Filed April 9, 1956 — 3 Sheets-Sheet 1

Inventor
G. Kähr

Aug. 25, 1959   G. KÄHR   2,900,676
LAMINATED PARQUET BOARDS
Filed April 9, 1956   3 Sheets-Sheet 2
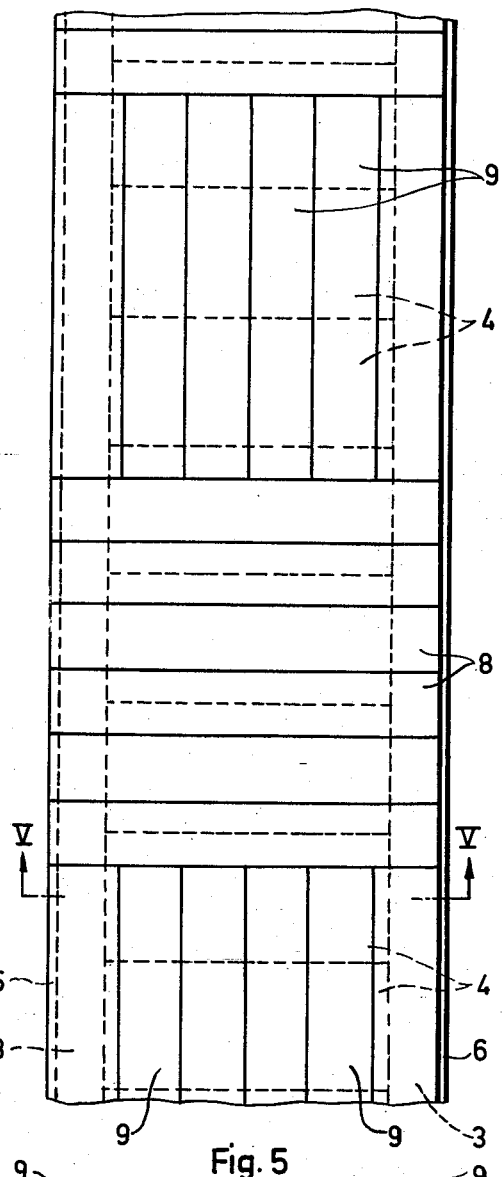
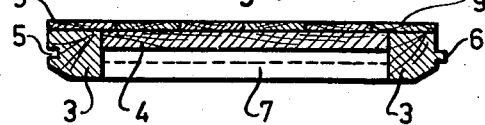
Inventor
G. Kähr Aug. 25, 1959 G. KÄHR 2,900,676
LAMINATED PARQUET BOARDS
Filed April 9, 1956 3 Sheets-Sheet 3

Inventor
G. Kähr

United States Patent Office

2,900,676
Patented Aug. 25, 1959

2,900,676

LAMINATED PARQUET BOARDS

Gustaf Kähr, Stockholm, Sweden

Application April 9, 1956, Serial No. 576,966

Claims priority, application Sweden November 4, 1955

3 Claims. (Cl. 20—7)

This invention relates to laminated parquet boards of the type comprising an upper wearing layer composed of parquet slabs and one single sublayer adhesively bonded to the sublayer.

From the point of view of reducing the cost of manufacture of such parquet board units and of more economically utilizing the lumber and hard wood material used, it is desirable to manufacture such laminated boards in lengths having a comparatively large transverse width. In previous constructions this demand has been satisfied by manufacturing boards comprising but two superimposed layers of slabs in such a way that the slabs in one of the layers substantially are disposed tranversely of the slabs in the other layer in order thereby to obtain the necessary coherence throughout the board. Thus the upper wearing surface has e.g. been composed of parquet slabs all or part of which has a run of grain in the transverse direction of the board whereas the sublayer or bottom layer is composed of slabs disposed in the direction of their grain longitudinally of the boards. However, boards of this type are subject to the disadvantage that their ability to resist warping in the transverse direction is insufficient if the boards are given a width approaching the economically desirable value. This is due to the fact that the transverse slabs in the upper wearing layer in this case become so long as to yield to the warping stresses set up in the board.

The invention sets out from a construction of the sublayer avoiding the above disadvantages and consisting in that the sublayer is composed of two marginal slabs extending in the direction of their grain along the opposite sides of the board and a plurality of slabs extending in the direction of their grain and oriented parallel to and transversely of and located between the said marginal slabs. In this arrangement of the slabs forming the sublayer the transverse slabs improve the rigidity of the board as a whole and in particular its capacity to resist transverse warping irrespective of the disposition of the parquet lengths in the upper wearing layer whereas the marginal slabs running along opposite edges of the board give the board the necessary rigidity in the longitudinal direction.

This general construction of the sublayer from which the present invention sets out, however, is liable to cause insufficient coherence in the board in particular if joints between certain parquet slabs or groups of parquet slabs in the upper wearing layer coincide with joints formed between slabs or groups of slabs of the two types of slabs constituting the sublayer. It is the purpose of the present invention to avoid this drawback while maintaining the advantages offered by the basic construction of the sublayer with regard to greater width of the board.

Other purposes and advantages of the present invention will be apparent from the following description of three types of parquet boards shown in the drawings and embodying the present invention, it being understood that the invention is not limited to the specific types of boards shown and described.

Figure 2:
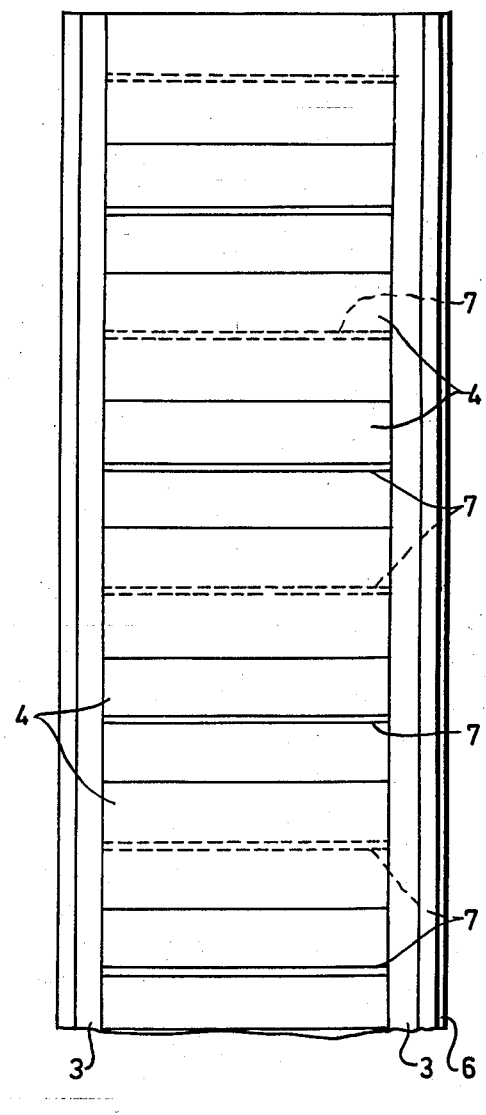
Figure 3:
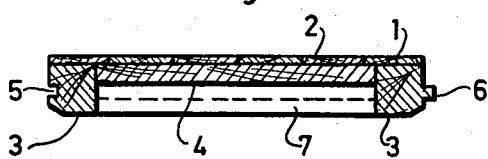
Figure 6:
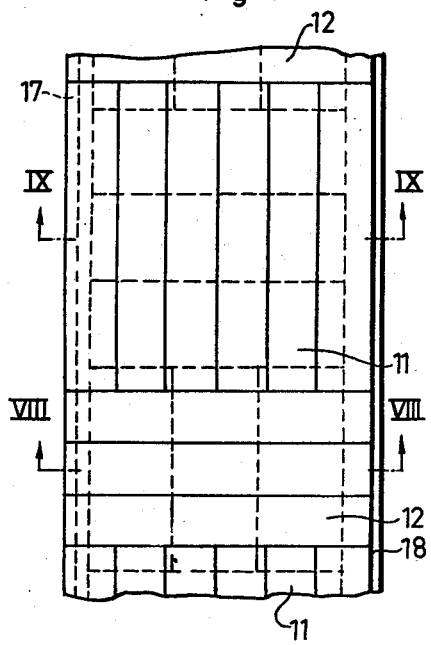
Figure 7:
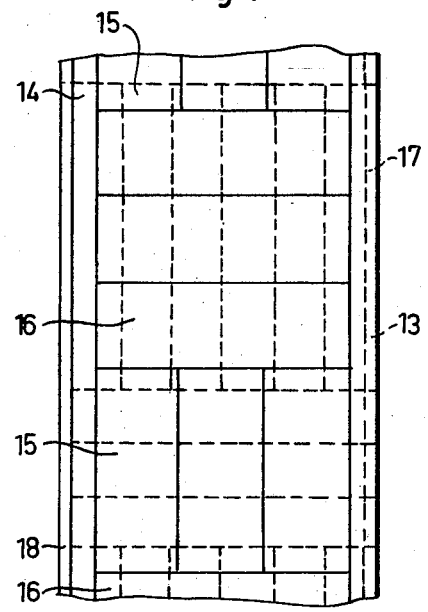
Figure 8:
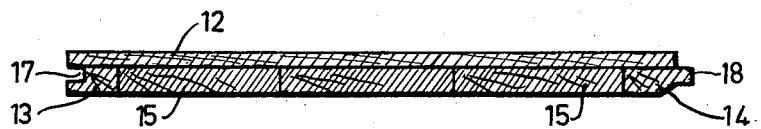
Figure 9:
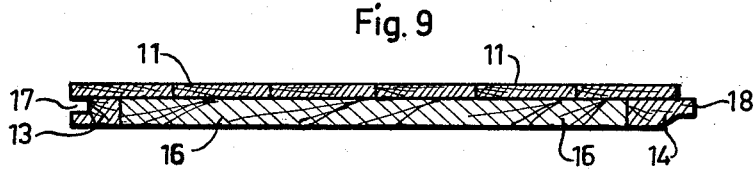

In the drawings:

Fig. 1 is a top view of a laminated parquet board constructed according to the invention, Fig. 2 is a bottom view of the same board, Fig. 3 is a transverse section along line 3—3 in Fig. 1, Fig. 4 is a top view of a length of another parquet board according to the invention, Fig. 5 is a transverse section along line 5—5 in Fig. 4, Fig. 6 is a top view of a part of a further modified laminated board according to the invention, Fig. 7 is a bottom view of the board last mentioned, Fig. 8 is a transverse section along line 8—8 in Fig. 6, Fig. 9 is a transverse section along line 9—9 in Fig. 6.

Referring to Figs. 1–3, the elongated parquet board shown comprises an upper wearing layer glued at its under surface to the upper surface of a sublayer. The upper wearing layer is composed of marginal parquet slabs 1 extending in the direction of their grain along the longitudinal edges of the board and of a plurality of intermediate parquet slabs 2 extending in the direction of their grain longitudinally of the board. The joints between abutting ends of longitudinally aligned slabs are staggered in adjacent rows such as to avoid the formation of aligned transverse joints across two or more rows. The sublayer comprises two marginal slabs 3 extending in the direction of their grain in parallel to the parquet slabs of the upper wearing layer along the longitudinal edges of the board and a plurality of slabs 4 extending in the direction of their grain at right angles relative to and between the said marginal slabs 3 and with their upper surface flush with the upper surface of the marginal slabs 3. In accordance with the basic principle of the invention the marginal slabs 3 of the sublayer are made narrower than the marginal parquet slabs 1 forming the outermost rows in the upper wearing layer such that the said parquet slabs 1 in the outermost rows bind across the joint formed in the sublayer between the abutting ends of the transverse slabs 4 and inner edges of the marginal slabs 3 to enhance the coherence of the board in the transverse direction. Even if the ends of the transverse slabs 4 in the way shown in Fig. 3 are not connected to the inner longitudianl edges of the marginal slabs 3 by a tongue and groove connection the binding effect brought about by the parquet slabs forming the outermost rows will be sufficient to ensure the coherence of the board in the transverse direction, the end surfaces of the transverse slabs 4 in this case preferably being glued to the inner side edges of the marginal slabs 3. By making the marginal slabs 3 narrower than the marginal parquet slabs 1 forming the outermost rows of the upper wearing layer the further desirable effect is obtained that the transverse slabs 4 of the sublayer each bind across all the intermediate parquet slabs 2 overlying the respective transverse slab 4 thus further enhancing the transverse coherence of the board.

The board is suitably provided with tongue and groove means along the longitudinal edges for joining the board to adjacent boards in the final flooring, a tongue 6 being formed on the right hand marginal slab 3 of the sublayer and a groove 5 in the left hand marginal slab 3 of the sublayer.

The width of the transversal slabs 4 crosswise of their run of grain is not critical, these slabs advantageously being cut from the same board material from which the marginal slabs 3 are made. The transversal slabs 4 are suitably provided with incisions 7 extending in the direction of the grain of the slabs, i.e. transversely of the board, and perpendicularly to the plane of the board.

A further embodiment of an elongated parquet board having a different parquet pattern in the upper wearing layer is described with reference to Figs. 4 and 5 of the drawings. In this embodiment the upper wearing layer is composed of a plurality of parquet slabs 8 and 9 arranged in a pattern comprising aligned fields each occupying the whole width of the board and composed of a plurality of parallel slabs of even length alternately extending respectively transversely of the board—slabs 8—and longitudinally of the board—slabs 9. The sublayer of the board shown in Figs. 4 and 5 is identical with the sublayer shown in Figs. 1–3 and described in connection therewith. Thus also in the embodiment according to Figs. 4 and 5 the marginal slabs 3 extending along the longitudinal edges of the sublayer are narrower than the outermost of the longitudinally extending parquet slabs of the upper wearing layer, the same desirable effect as that described in connection with Figs. 1–3 being obtained with regard to those portions of the board according to Figs. 4 and 5 in which the parquet slabs extend in the longitudinal direction of the board. Obviously a fully satisfactory binding effect is obtained in the other portions of the board by means of the transversely extending parquet slabs 8 binding across the whole width of the board.

The same subordinate features as described in connection with Figs. 1–3 may of course be applied in connection with the board according to Figs. 4 and 5. Thus, longitudinally extending tongue and groove means 5, 6 are indicated and incisions corresponding to incisions 7 may be provided for the purpose indicated above.

It will be apparent from the above described embodiments of the invention that the common principle relied upon in constructing laminated parquet boards of the type specified resides in so choosing the width of the marginal slabs of the sublayer and so arranging the parquet slabs of the upper wearing layer that in every section through the board transversely of the direction in which the marginal slabs of the sublayer extend the parquet slabs bind across the joints formed in the sublayer between the abutting edges of the marginal slabs and the transverse slabs. The basic principle of the invention may also be expressed by stating that the invention concerns laminated parquet boards comprising an upper wearing layer of a uniform thickness composed of parquet slabs including marginal slabs extending along opposite sides of the board and intermediary parquet elements, and a sublayer of a uniform thickness adhesively bonded to the upper layer and composed of two marginal slabs extending in the direction of their grain along said two opposite sides of the board and a plurality of intermediary elements extending in the direction of their grain transversely of and between said marginal slabs, intermediary elements of one of said layers, having their grain running transversely of the grain of the marginal slabs, overlapping both marginal slabs in the other layer so as to bind across intermediary elements in the other layer.

Figures 6 to 9 illustrate a further form of board structure in which invention is exemplified by an arrangement in which the parquet slabs of the upper wearing layer and the intermediate slabs of the sublayer are mutually arranged in groups so as to produce an enhanced binding effect longitudinally of the board that is in addition to the transverse binding effect described with reference to Figures 1 to 5 as to increase the strength of the laminated board. In the example shown the parquet slabs are arranged in alternating groups of longitudinally and transversely extending slabs 11 and 12, respectively, there being provided six mutually parallel slabs in each group of slabs 11, having their grain running in the longitudinal direction of the board, and three mutually parallel slabs in each group of slabs 12, having their grain running transversely of the board. The sublayer is composed of two marginal slabs 13 and 14 extending in the direction of their grain along two opposite sides of the board, and intermediate slabs arranged in alternating groups of longitudinally and transversely extending slabs 15 and 16, respectively, the slabs 15 having their grain running in the longitudinal direction of the board and the slabs 16 having their grain running transversely of the board. In the example shown there are provided three mutually parallel slabs in each group. The marginal slab 13 is provided with a longitudinally extending notch 17 which underlies a portion of the marginal edge of the wearing layer and cooperates therewith to define a longitudinal groove whereas the marginal slab 14 is provided with a tongue 18 that extends laterally beyond the adjacent edge of the wearing layer. The marginal slabs 13 and 14 as well as the intermediate slabs 15 and 16 are made of soft wood, such as pine or spruce, whereas the slabs of the wearing layer are made of hard wood, such as oak or beech. The wearing layer and the sublayer are glued together at their contacting surfaces. Due to the binding between the two layers according to the invention it is not necessary to glue the slabs of the same layer together at their edge surfaces. The flat inner sides of the marginal slabs 13 and 14 are preferably glued to the adjacent flat edges of the slabs 15 and 16.

As will appear from Figs. 6 and 7 the groups of slabs 11, 12 and 15, 16 in the upper and lower layers are so arranged mutually that a group of slabs 11 in the upper layer opposes a group of slabs 16 in the sublayer and a group of slabs 12 in the upper layer opposes a group of slabs 15 in the sublayer, the grain directions of two opposing layers crossing each other. Moreover, the widths of the opposite groups counted in the longitudinal direction of the board are different so that adjacent groups will overlap each other. Thus, the end portions of a group of slabs 15 in the sublayer having their grain running in the longitudinal direction of the board overlap the end portions of the two adjacent groups of slabs 11 in the upper layer which also have their grain running longitudinally of the board. The groups of slabs 15 and 11, which are in this way united at their overlapping ends, will bind the lower and upper layer together in the longitudinal direction of the board thereby increasing the bending strength of the board. The binding effect of the slabs 11, 16 and 12, 15 crossing each other in each pair of opposing groups will, of course, add to the strength of the board. The opposing groups of slabs may have the same width counted in the longitudinal direction of the board but in this case the two groups should be displaced longitudinally of the board so as to overlap the adjacent groups.

The board may be of any length but a length of 2 to 3 meters is suitable. The width may vary between 15 and 25 cm. but is preferably about 20 cm. The thickness may vary between 9 and 16 mm. but is usually about 13 mm. In order to make the board stiff and plane the thickness of the wearing layers should be from about 30 to 45 percent of the thickness of the sublayer. The slabs of the wearing layer should preferably have a width of from 25 to 40 mm., whereas the width of the slabs of the sublayer may vary within wide limits so that waste wood may be fully utilized. The board may be composed of more than two layers. Thus, a veneer layer may be glued to the lower side of the sublayer.

What is claimed is:

1. In a laminated parquet flooring board, the combination of a patterned wearing layer adhesively united with only a single patterned sublayer, said wearing layer consisting of a plurality of slabs of uniform thickness arranged in alternate groups of slabs aligned longitudinally of the board with the run of grain of the slabs of one group extending transversely to the run of grain of the slabs in the next adjacent group, said sublayer comprising marginal runners of uniform thickness underlying the wearing layer and extending in the direction of their grain along both longitudinal edges of and throughout the length of the board, said runners having facing flat inner sides and intermediate slabs of the same thickness as the runners, disposed between said marginal runners and having opposite flat edges contacting and opposing the respectively adjacent flat inner sides of the runners so as to form longitudinal joints covered by the slabs of the wearing layer, said intermediate slabs being arranged in alternate groups aligned longitudinally of the board with the run of grain of the slabs of one group extending transversely to the run of grain of the slabs in the next adjacent group, the slabs that extend longitudinally of the board in one layer being opposed by and adhesively secured to the slabs extending transversely of the board in the other layer, and the longitudinal extent of each group of slabs in one layer that have their run of grain extending transversely of the board being less than the longitudinal extent of the contacting group of longitudinally extending slabs in the other layer.

2. A laminated parquet flooring board as claimed in claim 1 and one runner having a tongue along the outer side thereof and extending laterally beyond the adjacent longitudinal edge of the wearing layer and the opposite edge of the board having a longitudinal groove therein.

3. A laminated parquet flooring board as claimed in claim 2 in which the other runner has a longitudinal notch therein that underlies a portion of the lower surface of the wearing layer and extends along the adjacent longitudinal edge of the board and said notch cooperating with said portion of the undersurface of the wearing layer to define said groove.

References Cited in the file of this patent

UNITED STATES PATENTS

| | | |
|---|---|---|
| 87,853 | Kappes | Mar. 16, 1869 |
| 1,054,070 | Woloshin | Feb. 25, 1913 |
| 2,491,498 | Kahr | Dec. 20, 1949 |

FOREIGN PATENTS

| | | |
|---|---|---|
| 843,588 | France | July 5, 1939 |